US012647519B1

(12) United States Patent
Batten

(10) Patent No.: US 12,647,519 B1
(45) Date of Patent: Jun. 2, 2026

(54) SYSTEMS AND METHODS FOR SESSION CONCURRENCY FOR ROLE-BASED COMMUNICATION CHANNELS WITH VIRTUAL ENDPOINTS

(71) Applicant: H.M. Electronics, Inc., Carlsbad, CA (US)

(72) Inventor: James Edward Batten, Bury St Edmunds (GB)

(73) Assignee: H.M. Electronics, Inc., Carlsbad, CA (US)

( * ) Notice: Subject to any disclaimer, the term of this patent is extended or adjusted under 35 U.S.C. 154(b) by 67 days.

(21) Appl. No.: 18/587,210

(22) Filed: Feb. 26, 2024

(51) Int. Cl.
| | |
|---|---|
| *H04M 3/00* | (2024.01) |
| *H04L 65/1069* | (2022.01) |
| *H04M 3/56* | (2006.01) |

(52) U.S. Cl.
CPC ........ *H04M 3/568* (2013.01); *H04L 65/1069* (2013.01)

(58) Field of Classification Search
CPC ........................... H04M 3/568; H04L 65/1069
USPC ..................................... 379/202.01, 158–159
See application file for complete search history.

(56) References Cited

U.S. PATENT DOCUMENTS

| | | | |
|---|---|---|---|
| 5,117,501 | A | 5/1992 | Childress |
| 7,082,314 | B2 | 7/2006 | Farmer |
| 7,920,539 | B2 | 4/2011 | Stanford |
| 8,447,324 | B2 | 5/2013 | Shuman |

| | | | | |
|---|---|---|---|---|
| 8,553,865 | B2 * | 10/2013 | Menard | .................. H04M 3/56 |
| | | | | 379/159 |
| 8,983,383 | B1 | 3/2015 | Haskin | |
| 9,408,022 | B1 | 8/2016 | O'Gwynn | |
| 9,641,926 | B2 | 5/2017 | Awiszus | |
| 9,641,933 | B2 | 5/2017 | Appelbaum | |
| 10,869,179 | B1 | 12/2020 | Ma | |
| 10,993,088 | B1 | 4/2021 | O'Gwynn et al. | |
| 11,310,634 | B2 | 4/2022 | O'Gwynn et al. | |
| 11,452,073 | B2 | 9/2022 | O'Gwynn et al. | |
| 11,665,713 | B2 | 5/2023 | O'Gwynn et al. | |
| 2003/0100274 | A1 | 5/2003 | Brown | |

(Continued)

FOREIGN PATENT DOCUMENTS

| | | |
|---|---|---|
| CA | 3083577 | 6/2019 |
| EP | 1207452 | 5/2002 |

*Primary Examiner* — William J Deane, Jr.
(74) *Attorney, Agent, or Firm* — Esplin & Associates, PC

(57) ABSTRACT

Systems and methods for supporting session concurrency in a communication system for role-based communication channels with virtual endpoints are disclosed. Exemplary implementations may: electronically store information, wherein the information includes associations between users and virtual endpoints, and between virtual endpoints and physical audio devices; receive information that indicates a first selection of a first physical audio device as a physical destination for audio information targeted to a first virtual endpoint; receive a first device-specific packet targeted to the first virtual endpoint; present audio information from the first device-specific packet by the first physical audio device; receive information that indicates an additional selection of a second physical audio device; receive a second device-specific packet targeted to the first virtual endpoint; present audio information from the second device-specific packet by both the first and second physical audio devices; and/or perform other steps.

21 Claims, 4 Drawing Sheets

(56) References Cited

U.S. PATENT DOCUMENTS

| | | | |
|---|---|---|---|
| 2003/0134666 A1 | 7/2003 | Fletcher | |
| 2003/0162504 A1 | 8/2003 | Sabongi | |
| 2004/0116071 A1 | 6/2004 | Hall | |
| 2004/0116074 A1 | 6/2004 | Fujii | |
| 2006/0045063 A1 | 3/2006 | Stanford | |
| 2006/0093117 A1 | 5/2006 | Agrawal | |
| 2006/0098606 A1 | 5/2006 | Pandey | |
| 2006/0193269 A1 | 8/2006 | Perraud | |
| 2007/0233905 A1* | 10/2007 | Hatano | H04R 3/00 |
| | | | 710/16 |
| 2008/0160977 A1* | 7/2008 | Ahmaniemi | H04W 4/02 |
| | | | 709/204 |
| 2008/0318592 A1 | 12/2008 | Mandalia | |
| 2009/0080396 A1 | 3/2009 | Song | |
| 2009/0291646 A1 | 11/2009 | Ong | |
| 2010/0094443 A1* | 4/2010 | Oh | H04M 3/568 |
| | | | 379/202.01 |
| 2010/0190518 A1 | 7/2010 | Lindner | |
| 2010/0271983 A1 | 10/2010 | Bryant | |
| 2012/0140747 A1 | 6/2012 | Taniguchi | |
| 2014/0153485 A1 | 6/2014 | Tsuda | |
| 2016/0127264 A1 | 5/2016 | Williamson | |
| 2016/0189249 A1 | 6/2016 | Meyer | |
| 2016/0344777 A1* | 11/2016 | Fahlgren | H04L 65/1073 |
| 2016/0366528 A1 | 12/2016 | Landqvist | |
| 2017/0070513 A1 | 3/2017 | Robertson | |
| 2017/0324807 A1 | 11/2017 | Gu | |
| 2018/0317165 A1 | 11/2018 | Krishnamoorthy | |
| 2019/0095251 A1 | 3/2019 | Wang | |
| 2019/0104377 A1 | 4/2019 | Nilsson | |
| 2020/0106630 A1 | 4/2020 | Bourassa | |
| 2021/0243150 A1 | 8/2021 | Vasamsetti | |
| 2021/0392471 A1 | 12/2021 | Ogwynn | |
| 2022/0053453 A1 | 2/2022 | O'Gwynn | |
| 2022/0070231 A1* | 3/2022 | Hasegawa | H04L 65/1093 |
| 2022/0094795 A1* | 3/2022 | O'Gwynn | H04L 65/4038 |
| 2022/0240057 A1 | 7/2022 | O'Gwynn | |
| 2022/0272564 A1 | 8/2022 | Teyeb | |
| 2022/0279552 A1 | 9/2022 | Teyeb | |
| 2022/0303392 A1 | 9/2022 | O'Gwynn | |
| 2022/0361145 A1 | 11/2022 | O'Gwynn | |
| 2023/0209574 A1 | 6/2023 | O'Gwynn | |
| 2023/0325145 A1 | 10/2023 | Ni | |
| 2023/0362026 A1* | 11/2023 | Bajaj | H04L 12/282 |
| 2023/0362304 A1 | 11/2023 | O'Gwynn | |
| 2023/0396967 A1 | 12/2023 | O'Gwynn | |
| 2024/0404430 A1* | 12/2024 | Currie | G06F 40/58 |

* cited by examiner

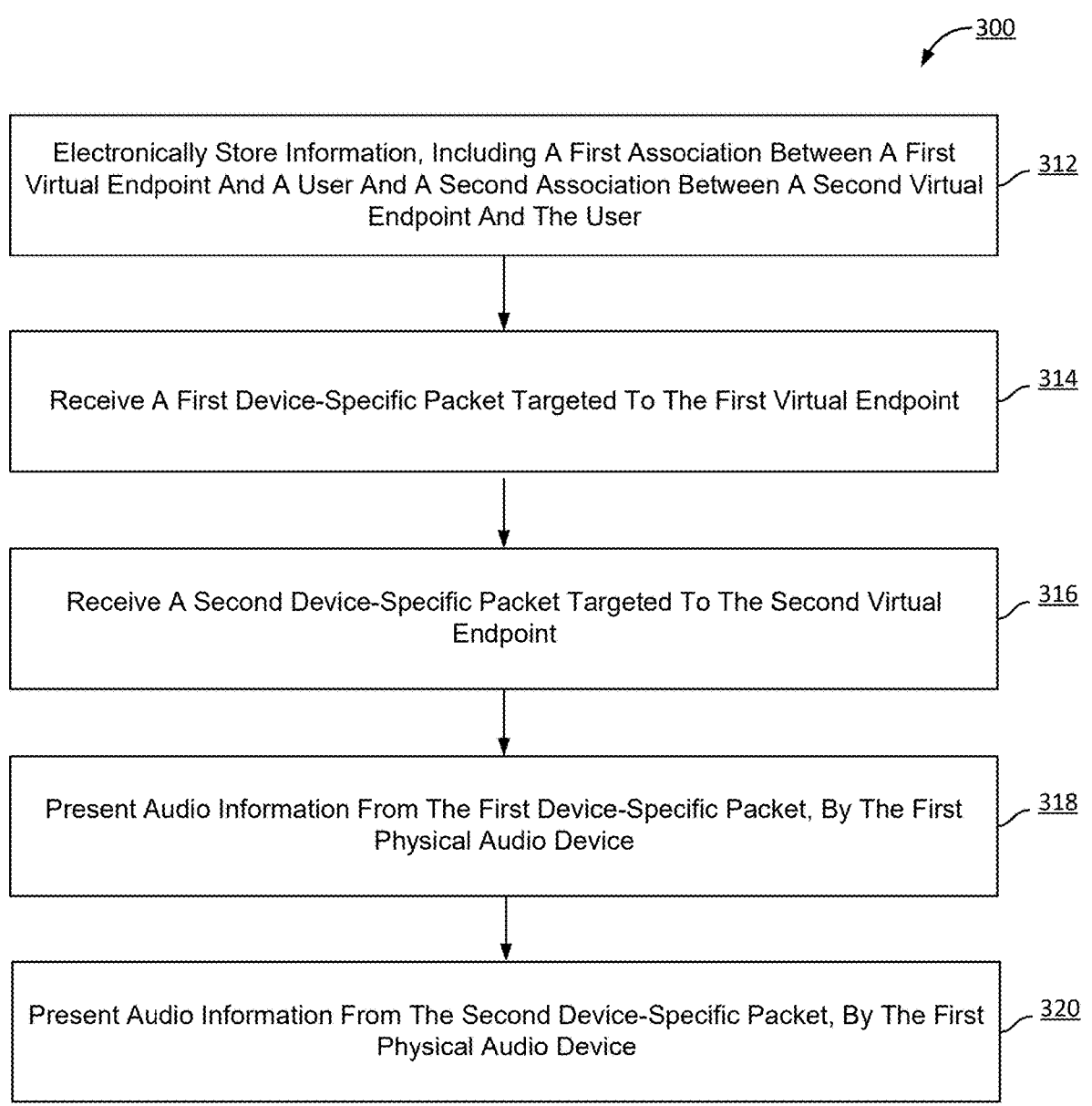

300

Electronically Store Information, Including A First Association Between A First Virtual Endpoint And A User And A Second Association Between A Second Virtual Endpoint And The User — 312

Receive A First Device-Specific Packet Targeted To The First Virtual Endpoint — 314

Receive A Second Device-Specific Packet Targeted To The Second Virtual Endpoint — 316

Present Audio Information From The First Device-Specific Packet, By The First Physical Audio Device — 318

Present Audio Information From The Second Device-Specific Packet, By The First Physical Audio Device — 320

*Fig. 3*

Device 304b

Device 304a

Role 304

Device 303b

Device 303a

Role 303

Device 305c

Device 305b

Belt Pack 302

Device 305a

Role 305

Audio control panel 301

Network(s) 13a

Device 307c

Device 307b

Device 307a

Role 307

Device 306b

Device 306a

Role 306

400

SYSTEMS AND METHODS FOR SESSION CONCURRENCY FOR ROLE-BASED COMMUNICATION CHANNELS WITH VIRTUAL ENDPOINTS

FIELD OF THE DISCLOSURE

The present disclosure relates to systems and methods for supporting session concurrency in a communication system, in particular for a communication system that facilitates role-based communication channels with virtual endpoints. Individual virtual endpoints are associated with one or more physical audio devices. Such communication systems may be used by groups of people interacting and/or otherwise working together.

BACKGROUND

Certain types of (communication) systems such as intercom systems are known. Communication systems using different types of physical (audio) devices are known.

SUMMARY

One aspect of the present disclosure relates to a system configured to support session concurrency for role-based communication channels with virtual endpoints, e.g., as used by a crew of employees in a quick-service restaurant. Individual virtual endpoints are associated with one or more physical audio devices, also referred to as "physical destinations" or "physical endpoints" in the system. In cases where an individual virtual endpoint is associated with more than one physical audio devices, these physical audio devices could be the same device type such as, by way of non-limiting example, multiple audio control panels located in different locations. Alternatively, and/or simultaneously, in some cases an individual virtual endpoint is associated with different physical audio devices of different types, such as, by way of non-limiting example, a particular type of wired audio device and a particular (different) type of wireless audio device. In some implementations, during use (i.e., during a communication sessions between users), a particular individual virtual endpoint may be associated with (e.g., to communicate) with a particular individual physical audio device of a particular individual device type, as currently selected by a user.

The system may include electronic storage and one or more hardware processors. The electronic storage may electronically store information. The information includes a first association between a first user and a first virtual endpoint. For example, the first virtual endpoint may correspond to and/or otherwise be related to the first user, at least for the purpose of a particular communication session. The first virtual endpoint represents a virtual destination for audio information in the system. For example, communication within the system may logically occur between connected (i.e., in session) virtual endpoints. In some cases, communication within the system may be between any combination of virtual endpoints and physical endpoints. Additionally, audio information may originate from a virtual endpoint and be routed and/or transferred to other devices in the system. The information includes a second association between the first virtual endpoint and a set of at least two physical audio devices available for selection, including a first physical audio device and a second physical audio device.

The one or more hardware processors are configured by machine-readable instructions to receive information from the first user that indicates a first selection of the first physical audio device as a physical destination for audio information in the communication system targeted to the first virtual endpoint. The one or more hardware processors are configured by machine-readable instructions to receive a first device-specific packet from a particular communication device associated with a particular user. As used herein, a packet said to be "from" a particular device should be understood to be "from or on behalf of" that particular device. As used herein, a packet said to "targeted to" a particular device should be understood to be "targeted to or intended for" that particular device. The first device-specific packet includes packetized uplink information based on audio information captured by the particular communication device. The first device-specific packet is targeted to the first virtual endpoint that is associated with the first user. The one or more hardware processors are configured by machine-readable instructions to effectuate, by virtue of the first selection, a presentation of audio information represented by the first device-specific packet, by the first physical audio device.

The one or more hardware processors are configured by machine-readable instructions to receive information from the first user that indicates an additional selection of the second physical audio device in addition to the first physical audio device as physical destinations for audio information in the communication system targeted to the first virtual endpoint. The one or more hardware processors are configured by machine-readable instructions to receive a second device-specific packet from the particular communication device associated with the particular user. The second device-specific packet includes packetized uplink information based on additional audio information captured by the particular communication device. The second device-specific packet is targeted to the first virtual endpoint that is associated with the first user. The one or more hardware processors are configured by machine-readable instructions to effectuate, by virtue of the first selection and the additional selection, a second presentation of audio information represented by the second device-specific packet, by both the first physical audio device and the second physical audio device.

Another aspect of the present disclosure relates to a method of supporting session concurrency in a communication system for role-based communication channels with virtual endpoints. Individual virtual endpoints are associated with one or more physical audio devices. In cases where an individual virtual endpoint is associated with more than one physical audio devices, these physical audio devices could be the same device type such as, by way of non-limiting example, multiple audio control panels located in different locations. Alternatively, and/or simultaneously, in some cases an individual virtual endpoint is associated with different physical audio devices of different types, such as, by way of non-limiting example, a particular type of wired audio device and a particular (different) type of wireless audio device. In some implementations, during use (i.e., during a communication sessions between users), a particular individual virtual endpoint may be associated with (e.g., to communicate) with a particular individual physical audio device of a particular individual device type, as currently selected by a user.

The method may include electronically storing information. The information includes a first association between a first user and a first virtual endpoint. The first virtual endpoint represents a virtual destination for audio information in the system. The information includes a second association between the first virtual endpoint and a set of at least two physical audio devices available for selection, including a first physical audio device and a second physical audio device. The method may include receiving information from the first user that indicates a first selection of the first physical audio device as a physical destination for audio information in the communication system targeted to the first virtual endpoint. The method may include receiving a first device-specific packet from a particular communication device associated with a particular user. The first device-specific packet includes packetized uplink information based on audio information captured by the particular communication device. The first device-specific packet is targeted to the first virtual endpoint that is associated with the first user. The method may include effectuating, by virtue of the first selection, a presentation of audio information represented by the first device-specific packet, by the first physical audio device.

The method may include receiving information from the first user that indicates an additional selection of the second physical audio device in addition to the first physical audio device as physical destinations for audio information in the communication system targeted to the first virtual endpoint. The method may include receiving a second device-specific packet from the particular communication device associated with the particular user. The second device-specific packet includes packetized uplink information based on additional audio information captured by the particular communication device. The second device-specific packet is targeted to the first virtual endpoint that is associated with the first user. The method may include effectuating, by virtue of the first selection and the additional selection, a second presentation of audio information represented by the second device-specific packet, by both the first physical audio device and the second physical audio device. The method may include other steps.

Another aspect of the present disclosure relates to a different method of supporting session concurrency in a communication system for role-based communication channels with virtual endpoints, and a corresponding communication system. The method may include electronically storing information. The information includes a first association between a first user and a first virtual endpoint. The information includes a second association between the first user and a second virtual endpoint. The first and second virtual endpoints represent virtual destinations for audio information in the communication system. The information includes a third association between the first virtual endpoint and a first physical audio device and a fourth association between the second virtual endpoint and the first physical audio device.

The method may include receiving a first device-specific packet from a particular communication device associated with a particular user. The first device-specific packet includes packetized uplink information based on audio information captured by the particular communication device. The first device-specific packet is targeted to the first virtual endpoint that is associated with the first user. The method may include receiving a second device-specific packet from the particular communication device (or any communication device in the communication system). The second device-specific packet includes packetized uplink information based on additional audio information captured by the particular communication device (or by any communication device). The second device-specific packet is targeted to the second virtual endpoint that is associated with the first user. The method may include effectuating a first presentation of audio information represented by the first device-specific packet, by the first physical audio device. The method may include effectuating a second presentation of audio information represented by the second device-specific packet, by the same first physical audio device.

As used herein, any association (or relation, or reflection, or indication, or correspondency) involving systems, information processing units, processors, communication devices, audio devices, communication protocols, base stations, microphones, headsets, audio control panels, belt packs, channels, communication groups, packets, information signals, sounds, wires, formats, standards, connections, instructions, selections, messages, user interfaces, presentations, settings, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof. As used herein, the terms "connect" and "couple" (and derivatives thereof) may be used interchangeably to indicate a link between multiple components that may or may not include intermediary components.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates an additional method of supporting session concurrency in a communication system for role-based communication channels with virtual endpoints, in accordance with one or more implementations.

DETAILED DESCRIPTION

Figure 1:
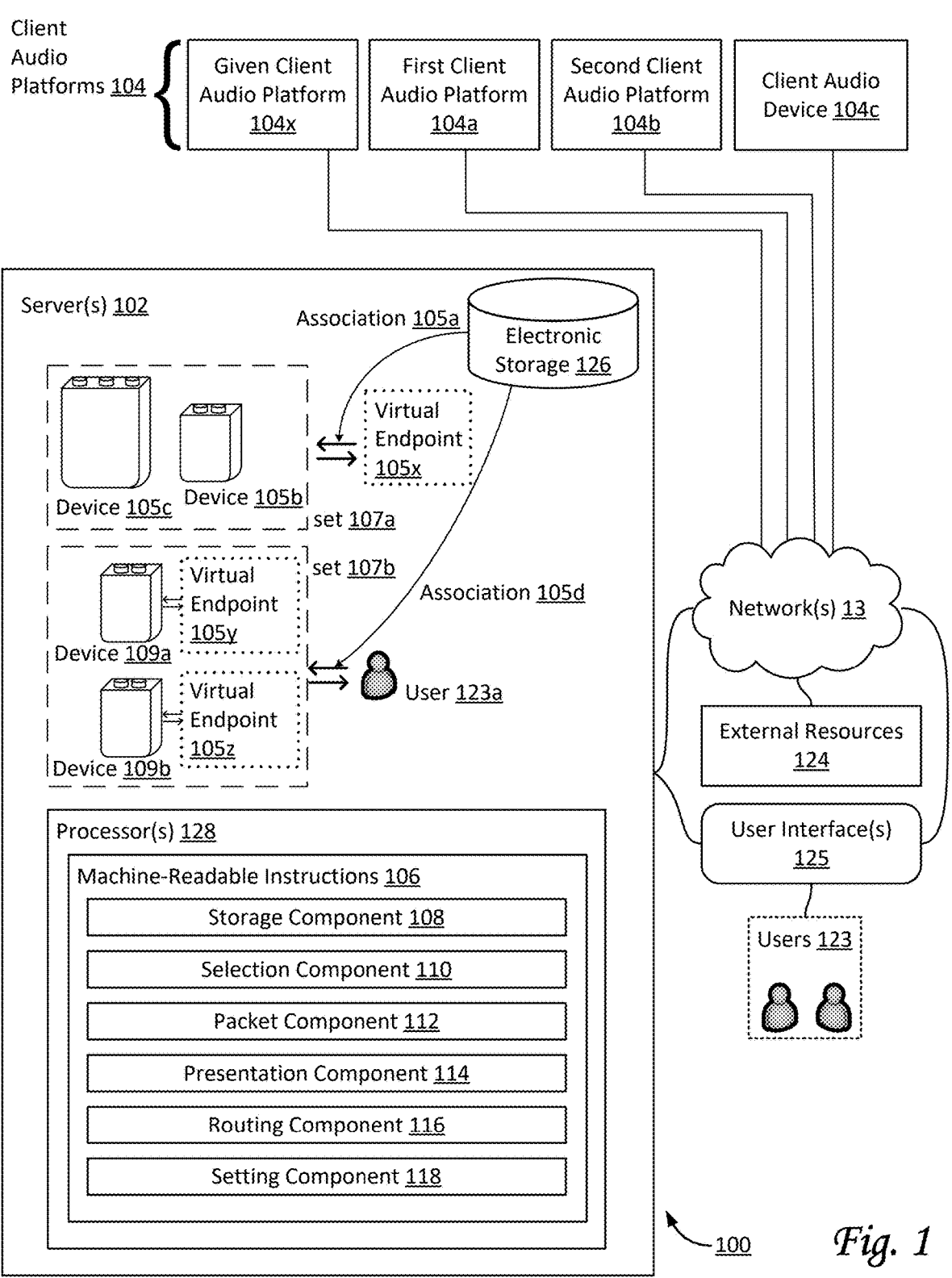
FIG. 1 illustrates a system configured to support session concurrency for role-based communication channels with virtual endpoints, in accordance with one or more implementations.

FIG. 1 illustrates a system 100 configured to support session concurrency for role-based communication channels with virtual endpoints. System 100 may be referred to as an intercom system, or as a communication system. In some implementations, system 100 may include one or more client audio platforms 104, one or more servers 102, one or more processors 128, electronic storage 126, one or more user interfaces 125 that can be used by users 123, one or more external resources 124, and/or other components. Communication system 100 may support audio conferences between multiple users, point-to-point communication sessions, point-to-multipoint communication sessions, group communications, and/or other modes and features. In some implementations, an individual virtual endpoint may be associated with an individual role, as used for the role-based communication channels. In some implementations, a role may be associated with a particular type of physical audio device. In some cases, a role may be associated with multiple types of physical audio devices. In some implementations, a role may be associated with a particular physical audio devices. In some cases, a role may be associated with multiple physical audio devices. In some cases, multiple roles may be associated with a particular physical audio device.

Users 123 of system 100 may include employees, staff members or crew members, managers and/or other stakeholders, and/or other groups of people interacting and/or otherwise working together. Users 123 of system 100 may be divided into sets and/or subsets of communication groups using communication channels. In some implementations, individual communication groups or channels may be specific to one or more (types of) roles and/or responsibilities of people interacting and/or otherwise working together. For example, a given communication group may be specific to one or more given roles or types of roles of people interacting and/or otherwise working together. By way of non-limiting example, people interacting and/or otherwise working together may operate a quick-service restaurant, a theater production, a theme park, a medical operating room, a sports team, a factory floor, and/or other opportunities, environments, and/or locations for interacting and communicating with groups of people.

Referring to FIG. 1, server(s) 102 may be configured to communicate with one or more client audio platforms 104 according to a client/server architecture, a point-to-point architecture, and/or other architectures. Communication within system 100 may be audio communication, video communication, and/or other types of communication. In some implementations, communication within system 100 may include full-duplex audio communication between two or more people and/or groups of people. In some cases, a communication group may include (e.g., as one of the participants) automation, e.g., through an artificial intelligence (AI) actor, which may take and/or respond to instructions and/or queries from people. Client audio platforms 104 may be configured to communicate with each other via network 13, server(s) 102, and/or other components of system 100. Individual client audio platforms 104 may be associated with individual ones of users 123.

Users 123 may access system 100 via client audio platforms 104. Client audio platforms 104 may include a given client audio platform 104x, a first client audio platform 104a, a second client audio platform 104b, a client audio device 104c, and/or other physical communication devices (also referred to as physical audio devices). First client audio platform 104a may be associated with a first user, second client audio platform 104b may be associated with a second user, and so forth. Client audio platforms 104 may include portable communication devices, such as client audio device 104c. In some implementations, communication between client audio platforms 104 may be performed on a local communications network, such as, by way of non-limiting example, a local area network. Alternatively, and/or simultaneously, in some implementations, the local communications network may include a personal area network. For example, the local communications network may be used in a restaurant, a service location, a theater, a sports arena, an office, a building, a construction site, and/or in other localized areas.

Communications within system 100 may be based on the exchange of packets of information that are formatted in one or more particular formats. As used herein, the direction towards one or more client audio platforms 104 may be referred to as downlink and/or downstream. As used herein, the direction originating from one or more client audio platforms 104 may be referred to as uplink and/or upstream. Accordingly, information provided through uplink communication may be referred to as uplink information, and information provided through downlink communication may be referred to as downlink information.

In some implementations, packets may be formatted using a format based on the (IEEE) 802.11 family of standards. In some implementations, packets may be formatted using a format similar to and/or based on one or more of the AES67 standard, the MADI standard, the DANTE standard, and/or other standards. In some implementations, packets may have a proprietary format. In some implementations, packets containing audio information may be transferred and/or presented to (a central element of) system 100 for distribution and/or delivery to specific endpoints. By way of non-limiting example, in some implementations, downlink packets may be broadcast packets that are transmitted to multiple communication devices at once. Other implementations may use no broadcast packets. In some implementations, uplink packets may be device-specific packets that are transmitted by a particular communication device. Packetized communication may have overhead, e.g., due to the use of header information, which may reduce the efficiency of the communication. In some implementations, broadcast packets may be more efficient than uplink packets, since (audio) information for multiple communication devices may be transmitted at once, whereas uplink packets may contain information from a single communication device. The information within packets may be based on audio information captured by client audio platforms 104.

System 100 may use different communication protocols, communication formats, and/or communication links to communicate with different ones (and/or different types) of communication devices and/or other components of system 100. In some implementations, communication in system 100 may be supported without the need or use of cellular networks or public networks. In some implementations, system 100 supports the use of personal computing/communication devices (such as smart phones) as physical endpoints for communication in system 100. In some implementations, system 100 supports the use of personal computing/communication devices (such as smart phones) as physical audio devices for communication in system 100.

Server(s) 102 and/or processor(s) 128 may be configured by machine-readable instructions 106. Machine-readable instructions 106 may include one or more instruction components. The instruction components may include computer program components. The instruction components may include one or more of storage component 108, selection component 110, packet component 112, presentation component 114, routing component 116, setting component 118, and/or other instruction components. In some implementations, one or more of the instruction components may be part of other servers and/or client audio platforms 104.

Storage component 108 may be configured to electronically store and/or retrieve information, e.g., in electronic storage 126. Stored information may include associations between (individual) users 123 and (individual) client audio platforms 104. For example, a first association may be between first client audio platform 104a and a first user, a second association may be between second client audio platform 104b and a second user, and so forth. Stored information may include associations between (individual) users 123 and (individual) virtual endpoints. A virtual endpoint represents a destination (and/or origin) for audio information in a system (e.g., in system 100). For example, a particular virtual endpoint may correspond to and/or otherwise be related to a particular user, at least for the purpose of a particular communication session. Stored information may include associations between (individual) virtual endpoints and (individual) physical audio devices (e.g., client audio platforms 104). In some implementations, stored information may include associations between (individual) virtual endpoints and (individual) users 123. In some implementations, stored information may include associations between (individual) virtual endpoints and (individual) physical audio device types. In particular, certain stored information may include associations between (individual) virtual endpoints and sets of physical audio devices (e.g., client audio platforms 104). For example, a particular association may be between a particular virtual endpoint and a particular (physical) audio device type available for selection (by a user). For example, a particular association may be between a particular virtual endpoint and a particular set of at least two physical audio devices available for selection (by a user). For example, such a set may include a first physical audio device and a second physical audio device, and/or other physical audio devices. In some implementations, multiple virtual endpoints may be associated with the same physical audio device. In some implementations, (individual) virtual endpoints may be associated with (individual) roles in system 100. In some implementations, (individual) virtual endpoints may be associated with (individual) communication channels in system 100.

By way of non-limiting example, FIG. 1 illustrates that electronic storage 126 includes an association 105a (depicted by matching arrows in opposite directions) between a virtual endpoint 105x (depicted by a dotted-line rectangle) and a set 107a of two physical audio devices: a first physical audio device 105b (e.g., a belt pack of a first type) and a second physical audio device 105c (e.g., a belt pack of a second type, in this example different from the first type). Additionally, FIG. 1 illustrates that electronic storage 126 includes an association 105d (depicted by matching arrows in opposite directions) between a set 107b of multiple virtual endpoints (virtual endpoint 105y and virtual endpoint 105z) and user 123a. Virtual endpoint 105y is associated with a physical audio device 109a (e.g., a belt pack) and virtual endpoint 105z is associated with a physical audio device

109b (e.g., depicted as another belt pack, but potentially using the same belt pack as physical audio device 109a).

Referring to FIG. 1, selection component 110 may be configured to receive information from users 123 and/or on behalf of users 123. In some implementations, the received information may indicate a selection for a particular (physical) audio device from a set of multiple (physical) audio devices (available for selection). In some implementations, the received information may indicate a selection for an additional (physical) audio device from a set of multiple (physical) audio devices. In some implementations, the received information may indicate a selection for multiple (physical) audio devices from a set of (physical) audio devices. In some implementations, the received information may indicate a selection for a particular (physical) audio device type. For example, the selection may select one or more audio devices as one or more physical destinations for audio information targeted to a particular virtual endpoint. Additionally, audio information may originate from the particular virtual endpoint and be routed and/or transferred to other devices in system 100. In other words, by virtue of a particular selection, a virtual endpoint in system 100 may be resolved to one or more particular physical audio devices (acting as both destinations and origins of audio information within system 100).

The particular set of physical audio devices that is available for selection may be associated with a particular virtual endpoint (e.g., this information may be stored in electronic storage 126). These selections may be modified during use of system 100. For example, additional information may be received by selection component 110, indicating a new or additional selection of a different physical audio device as the physical destination targeted to the particular virtual endpoint. Accordingly, a given user may switch from one physical audio device to another physical audio device during use of system 100, without disconnecting the communication session in progress with the given user. Note that other users of system 100 are not involved in this switch (i.e., do not need to take any action to accomplish or accommodate this switch), and can continue to communicate with the given user without modifying or re-configuring communication settings (regardless of using 1-on-1 communication sessions or group-based communications involving more than two people). In some implementations, particular audio targeted to the same virtual endpoint (at different moments in time) may arrive at and/or be presented by different physical audio devices in accordance with current selections. Additionally, particular audio originating from the same virtual endpoint (at different moments in time) may be captured at and by different physical audio devices in accordance with current selections. In some cases, the other users and/or audio devices within system 100 do not know (and do not need to know) any of the current selections for particular virtual endpoints.

In some implementations, selection component 110 may be configured to select and/or effectuate selection of one physical audio device as a physical endpoint (e.g., destination and origin) for audio information routed and/or transferred to and/or from a particular virtual endpoint. In some implementations, selection component 110 may be configured to select and/or effectuate selection of multiple physical audio devices as physical endpoints (e.g., destination and origin) for audio information routed and/or transferred to and/or from a particular virtual endpoint.

Packet component 112 may be configured to receive packets from communication devices (e.g., client audio platforms 104 and/or other audio devices). Received packets may be associated with a particular user or users as the origin of the audio information included in the packets. For example, included audio information may have been captured by a particular (physical) audio device of the particular user. Received packets may be targeted to one or more of a specific user or a set of users, a specific communication group, a specific communication device or a set of communication devices, and/or a specific virtual endpoint or a set of virtual endpoints. For example, a particular received packet may be targeted to a particular virtual endpoint (which may in turn be associated with a specific user and/or a specific role). For example, a particular received packet may be targeted to a particular communication group, which includes one or more particular virtual endpoints. In some implementations, packet component 112 may be configured to modify received packets. In some implementations, packet component 112 may be configured to generate packets, e.g., based on received packets. In some implementations, packet component 112 may be configured to transfer packets to destinations within system 100, including but not limited to client audio platforms 104.

Presentation component 114 may be configured to effectuate presentations of audio information on physical audio devices such as, e.g., client audio platforms 104. Presentation component 114 may effectuate a presentation of audio information represented by a particular packet to the user associated with the particular one or more physical audio devices that were targeted by the particular packet. In case a given packet is targeted to a given virtual endpoint, presentation component 114 may effectuate a presentation of audio information, as represented by the given packet, by the particular one or more physical audio devices as selected (by the corresponding user) as the one or more physical destinations for the given virtual endpoint. In case given packets are targeted to different virtual endpoints, presentation component 114 may effectuate presentations of audio information by the particular physical audio devices as the physical destinations for the virtual endpoints. Presentation of audio information on a particular physical audio device, as effectuated by presentation component 114, may be in accordance with one or more targets of one or more packets, as well as in accordance with user selections of one or more communication groups and/or a particular physical audio device.

Presentation component 114 may be configured to effectuate presentations of user interfaces 125 on physical audio devices such as, e.g., client audio platforms 104, as well as other client computing platforms. User interfaces 125 may be configured to obtain entry and/or selection of user input from users 123. For example, a particular user interface 124 may obtain user input from a particular user to perform one or more actions and/or steps. The particular user may be associated with a particular virtual endpoint. The particular virtual endpoint may be associated with a first physical audio device and a second physical audio device, available for selection by the particular user.

For example, the actions and/or steps may include a selection of one or more communication groups either the particular user and/or the particular virtual endpoint will belong to. This may be referred to as "team selection". For example, the actions and/or steps may include a selection of a shared setting and/or parameter (and/or value thereof) that is shared among multiple physical audio devices, e.g., among the first physical audio device and the second physical audio device. In some implementations, the shared setting is role-specific (i.e., virtual endpoint-specific), but not specific to a single device. In some implementations, the actions and/or steps may include a selection of a device-specific setting and/or parameter (and/or value thereof) that is specific to a single physical audio device. In some implementations, the actions and/or steps may include controlling whether selection of an individual physical audio device from a set of physical audio devices as the physical destination requires an access code. In some implementations, the actions and/or steps may include controlling whether selection of an individual physical audio device from a set of physical audio devices as the physical destination is permissible if that individual physical audio device is currently in use (i.e., has already been selected as a given virtual endpoint). In some cases, if this is permissible, an access code may be required by the user to effectuate the new selection.

Routing component 116 may be configured to transfer and/or route particular packets to and/or from particular physical audio devices, e.g., in accordance with selections as established by selection component 110. In some implementations, routing component 116 may cause a particular transfer or routing of particular packets to and/or from particular physical audio devices, e.g., in accordance with (user) selections, system settings, and/or other types of control within system 100.

Setting component 118 may be configured to apply and/or control settings, parameters, and/or values thereof, within system 100. For example, setting component 118 may apply and/or control a particular setting for a particular physical audio device. In some implementations, setting component 118 may apply and/or control one or more shared settings, e.g., as selected by a particular user through a particular user interface 125 (and described in relation to presentation component 114 elsewhere in this disclosure). For example, responsive to a first physical audio device being selected as a physical destination for audio information in the system targeted to a particular virtual endpoint, setting component 118 may be configured to apply and/or control the shared setting to the first physical audio device. Subsequently, a presentation of audio information by the first physical audio device may be controlled by and/or affected by the shared setting. For example, responsive to a second physical audio device being selected as the physical destination for audio information in the system targeted to the particular virtual endpoint, setting component 118 may be configured to apply and/or control the shared setting to the second physical audio device. Subsequently, a presentation of audio information by the second physical audio device may be controlled by and/or affected by the shared setting.

In some implementations, shared settings may include audio settings, e.g., for a particular virtual endpoint. By way of non-limiting example, audio settings may include one or more of input gain, output gain, side-tone gain, and/or other types of gain for the particular virtual endpoint. In some implementations, one or more audio settings may be shared among the physical audio devices that are associated with the particular virtual endpoint, insofar a particular audio setting is applicable. For example, assignments of team members or communication groups to particular communication channels or shortcuts may be shared among different physical audio devices. For example, a user-specified and/or user-programmed action and/or shortcut may be shared among different physical audio devices. In some implementations, one or more audio settings may be applied to and/or controlled for a particular physical audio device. By way of non-limiting example, in some cases, one or more audio settings may include one or more settings to compensate for network latency, one or more settings for (default) display brightness (for example for panels in different lighting environments), and/or other device settings.

Figure 4:
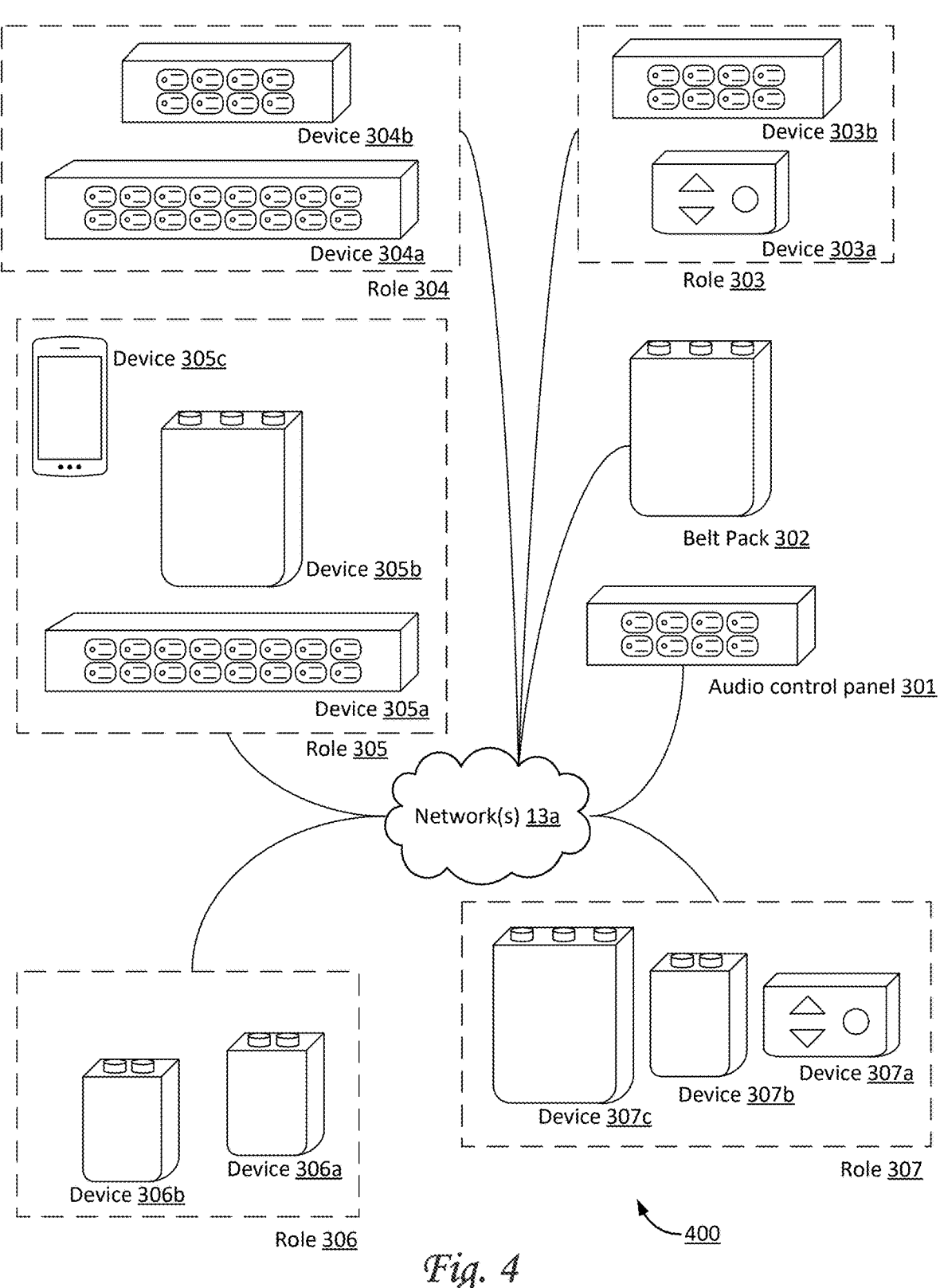
FIG. 4 illustrates an exemplary communication diagram as may be implemented by a system configured to support session concurrency for role-based communication channels with virtual endpoints, in accordance with one or more implementations.

By way of non-limiting example, FIG. 4 illustrates an exemplary communication diagram 400 as may be implemented by system 100, depicting communication connections between different virtual endpoints (or roles), different physical audio devices, and a communication network 13a. In some implementations, the elements of a system may form a hub and spoke hierarchy. Other implementations may be less centralized, or more decentralized. For example, as depicted, the physical audio devices include an audio control panel 301 and a (wireless) belt pack 302, and/or other devices. In some cases, a virtual endpoint (or role) may be associated with two or more physical audio devices that are similar (or even the same type). For example, as depicted here, a role 304 is associated with two devices: a first audio panel 304a and a second audio panel 304b. Similarly, as depicted here, a role 306 is associated with two devices of the same type: a first belt pack 306a and a second belt pack 306b. In some cases, a virtual endpoint (or role) may be associated with different types of physical audio devices. For example, as depicted here, a role 303 is associated with two different devices: a wired belt pack 303a and a wireless belt pack 303b. For example, as depicted here, a role 305 is associated with three different devices: an audio control panel 305a, a belt pack 305b, and a personal smart phone 305c. In some cases, a virtual endpoint (or role) may be associated with more than two different physical audio devices, as depicted for role 305. As another example, a role 307 is associated with three devices: a first belt pack 307a, a second belt pack 307b, and a third belt pack 307c.

Referring to FIG. 1, in some implementations, a given audio platform and/or device may include one or more processors configured to execute computer program components. The computer program components may be configured to enable an expert or user associated with the given audio platform and/or device to interface with system 100 and/or external resources 124, and/or provide other functionality attributed herein to client audio platform(s) 104. By way of non-limiting example, the given audio platform and/or device may include one or more of a desktop computer, a laptop computer, a handheld computer, a tablet computing platform, a NetBook, a smart phone, a wireless belt pack, a wired belt pack, an audio control panel, a smart band, smart glasses, a headset, an earbud, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, individual information processing units may be servers.

User interfaces 125 may be configured to facilitate interaction between users 123 and system 100 and/or between users 123 and client audio platforms 104. For example, user interfaces 125 may provide an interface through which users 123 may provide information to and/or receive information from system 100. In some implementations, user interface 140 may include one or more of a display screen, touchscreen, monitor, a smart band, a keyboard, buttons, switches, knobs, levers, mouse, speakers, headphones, microphones, sensors to capture voice commands, sensors to capture eye movement and/or body movement, sensors to capture hand and/or finger gestures, and/or other user interface devices configured to receive and/or convey user input. In some implementations, one or more user interfaces 125 may be included in one or more client audio platforms 104. In some implementations, one or more user interfaces 125 may be included in system 100, including but not limited to user interface 125x depicted in FIG. 4.

Referring to FIG. 1, electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 124, information received from server(s) 102, information received from communication device(s) 104, and/or other information that enables server(s) 102 to function as described herein.

In some implementations, information stored in electronic storage 126 may include information that represents associations of individual voice communication channels with one or more communication groups. The individual ones of the one or more communication groups may be specific to one or more roles of people and/or employees, e.g., employees in a quick-service restaurant. The individual ones of the one or more communication groups may be specific to one or more types of roles of interacting people and/or employees, e.g., employees in a quick-service restaurant. Different sets of communication groups (overlapping in different ways) may use voice communication channels differently as needed, using different sets of associations.

Referring to FIG. 1, processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, 116, and/or 118, and/or other components. Processor(s) 124 may be configured to execute components 108, 110, 112, 114, 116, and/or 118, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, in implementations in which processor(s) 124 includes multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 124 may be configured to execute one or more additional components that may perform some or all of the functionality attributed below to one of components 108, 110, 112, 114, 116, and/or 118.

In some implementations, server(s) 102, client audio platform(s) 104, and/or external resources 124 may be operatively linked via one or more electronic communication links. For example, such electronic communication links may be established, at least in part, via one or more networks 13 and/or other networks. It will be appreciated that this is not intended to be limiting, and that the scope of this disclosure includes implementations in which elements of system 100 may be operatively linked via some other communication media.

Figure 2:
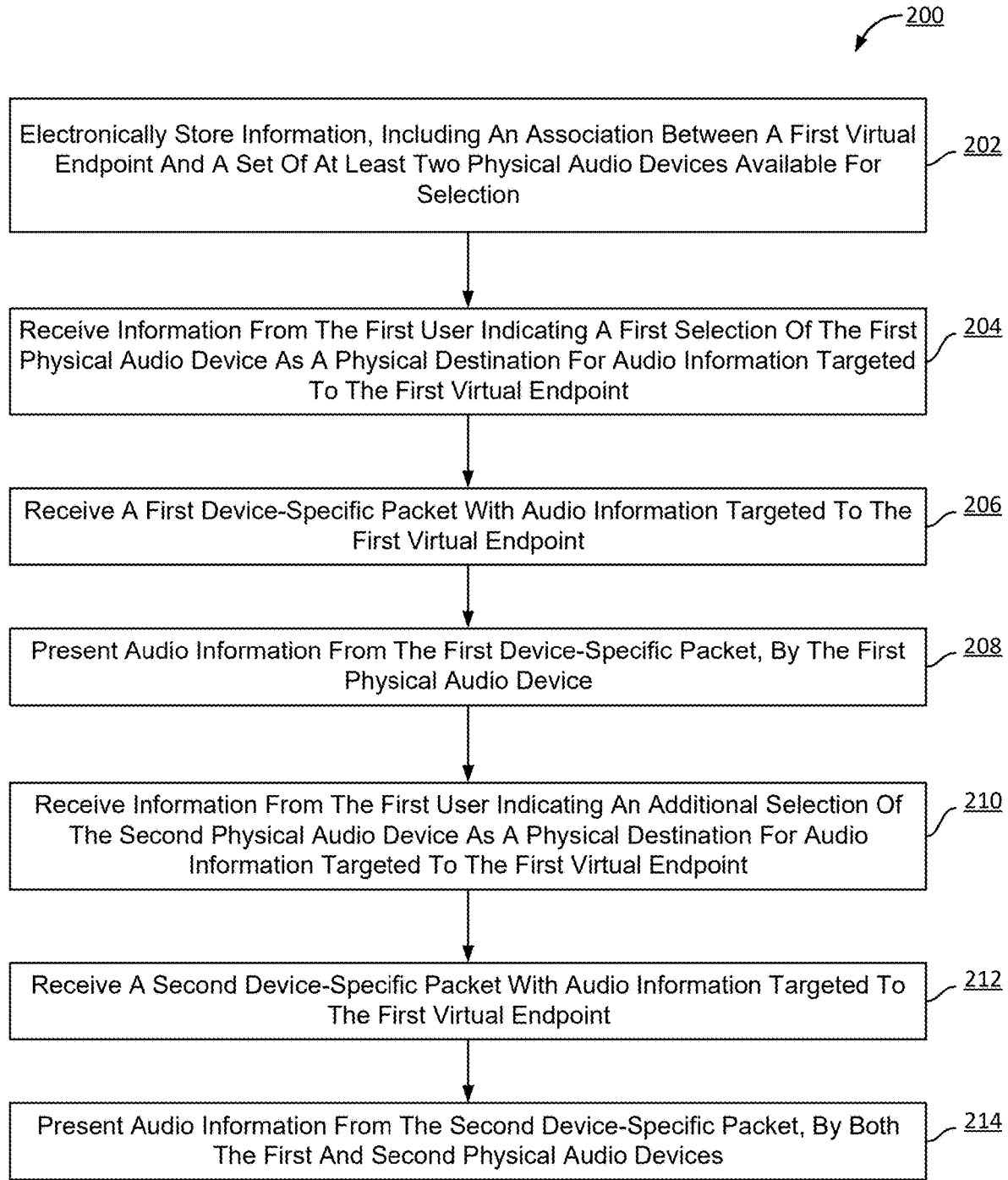
FIG. 2 illustrates a method of supporting session concurrency in a communication system for role-based communication channels with virtual endpoints, in accordance with one or more implementations.

FIG. 2 and FIG. 3 illustrate a method 200 and a method 300 of supporting session concurrency in a communication system for role-based communication channels with virtual endpoints, in accordance with one or more implementations. The operations of methods 200 and 300 presented below are intended to be illustrative. In some implementations, methods 200 and 300 may be accomplished with one or more additional operations not described, and/or without one or more of the operations discussed. Additionally, the order in which the operations of methods 200 and 300 are illustrated in FIG. 2 and FIG. 3 and described below is not intended to be limiting.

In some implementations, methods 200 and 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 200 and 300 in response to instructions stored electronically on an electronic storage medium. The one or more processing devices may include one or more devices configured through hardware, firmware, and/or software to be specifically designed for execution of one or more of the operations of methods 200 and 300.

Regarding method 200 in FIG. 2, at an operation 202, information is stored electronically. The information includes a first association between a first user and a first virtual endpoint. The first virtual endpoint represents a virtual destination for audio information in the communication system. The information includes a second association between the first virtual endpoint and a set of at least two physical audio devices available for selection, including a first physical audio device and a second physical audio device. In some embodiments, operation 202 is performed by a storage component the same as or similar to storage component 108 (shown in FIG. 1 and described herein).

At an operation 204, information is received from the first user that indicates a first selection of the first physical audio device as a physical destination for audio information in the communication system targeted to the first virtual endpoint. In some embodiments, operation 204 is performed by a selection component the same as or similar to selection component 110 (shown in FIG. 1 and described herein).

At an operation 206, a first device-specific packet is received from a particular communication device associated with a particular user. The first device-specific packet includes packetized uplink information based on audio information captured by the particular communication device. The first device-specific packet is targeted to the first virtual endpoint that is associated with the first user. In some embodiments, operation 206 is performed by a packet component the same as or similar to packet component 112 (shown in FIG. 1 and described herein).

At an operation 208, by virtue of the first selection, a presentation is effectuated of audio information represented by the first device-specific packet, by the first physical audio device. In some embodiments, operation 208 is performed by a presentation component the same as or similar to presentation component 114 (shown in FIG. 1 and described herein).

At an operation 210, information is received from the first user that indicates an additional selection of the second physical audio device in addition to the first physical audio device as physical destinations for audio information in the communication system targeted to the first virtual endpoint. In some embodiments, operation 210 is performed by a selection component the same as or similar to selection component 110 (shown in FIG. 1 and described herein).

At an operation 212, a second device-specific packet is received from the particular communication device associated with the particular user. The second device-specific packet includes packetized uplink information based on additional audio information captured by the particular communication device. The second device-specific packet is targeted to the first virtual endpoint that is associated with the first user. In some embodiments, operation 212 is performed by a packet component the same as or similar to packet component 112 (shown in FIG. 1 and described herein).

At an operation 214, by virtue of the first selection and the additional selection, a second presentation is effectuated of audio information represented by the second device-specific packet, by both the first physical audio device and the second physical audio device. In some embodiments, operation 214 is performed by a presentation component the same as or similar to presentation component 114 (shown in FIG. 1 and described herein).

Regarding method 300 in FIG. 3, at an operation 312, information is stored electronically. The information includes a first association between a first user and a first virtual endpoint. The information includes a second association between the first user and a second virtual endpoint. The first and second virtual endpoints represent virtual destinations for audio information in the communication system. The information includes a third association between the first virtual endpoint and a first physical audio device and a fourth association between the second virtual endpoint and the first physical audio device. In some embodiments, operation 312 is performed by a storage component the same as or similar to storage component 108 (shown in FIG. 1 and described herein).

At an operation 314, a first device-specific packet is received from a particular communication device associated with a particular user. The first device-specific packet includes packetized uplink information based on audio information captured by the particular communication device. The first device-specific packet is targeted to the first virtual endpoint that is associated with the first user. In some embodiments, operation 314 is performed by a packet component the same as or similar to packet component 112 (shown in FIG. 1 and described herein).

At an operation 316, a second device-specific packet is received from the particular communication device (or any device). The second device-specific packet includes packetized uplink information based on additional audio information captured by the particular communication device. The second device-specific packet is targeted to the second virtual endpoint that is associated with the first user. In some embodiments, operation 316 is performed by a packet component the same as or similar to packet component 112 (shown in FIG. 1 and described herein).

At an operation 318, a first presentation is effectuated of audio information represented by the first device-specific packet, by the first physical audio device. In some embodiments, operation 318 is performed by a presentation component the same as or similar to presentation component 114 (shown in FIG. 1 and described herein).

At an operation 320, a second presentation is effectuated of audio information represented by the second device-specific packet, by the first physical audio device. In some embodiments, operation 320 is performed by a presentation component the same as or similar to presentation component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A communication system configured to support session concurrency for role-based communication channels with virtual endpoints, wherein individual virtual endpoints are associated with one or more physical audio devices, the system comprising:

electronic storage configured to electronically store information, wherein the information includes a first association between a first user and a first virtual endpoint, wherein the first virtual endpoint represents a virtual destination for audio information in the communication system that is not a physical endpoint, wherein the information includes a second association between the first virtual endpoint and a set of at least two physical audio devices available for selection by the first user as a physical destination for audio information in the communication system that is targeted to the first virtual endpoint, including a first physical audio device and a second physical audio device that is separate from and different from the first physical audio device;

one or more hardware processors configured by machine-readable instructions to:

receive information from the first user that indicates a first selection of the first physical audio device as the physical destination for the audio information in the communication system that is targeted to the first virtual endpoint;

receive a first device-specific packet from a particular communication device associated with a particular user, wherein the first device-specific packet includes packetized uplink information based on particular audio information captured by the particular communication device, wherein the first device-specific packet is targeted to the first virtual endpoint that is associated with the first user;

by virtue of the first selection, effectuate a presentation of the particular audio information represented by the first device-specific packet, the presentation being performed by the first physical audio device;

receive information from the first user that indicates an additional selection of the second physical audio device in addition to the first physical audio device as physical destinations for subsequent audio information in the communication system that is targeted to the first virtual endpoint, wherein the subsequent audio information is subsequent to the particular audio information;

receive a second device-specific packet from the particular communication device associated with the particular user, wherein the second device-specific packet includes packetized uplink information based on additional audio information captured by the particular communication device, wherein the second device-specific packet is targeted to the first virtual endpoint that is associated with the first user; and by virtue of the first selection and the additional selection, effectuate a second presentation of the additional audio information represented by the second device-specific packet, wherein the second presentation is performed by both the first physical audio device and the second physical audio device.

2. The communication system of claim 1, wherein the first physical audio device is an audio control panel and wherein the second physical audio device is a wireless belt pack.

3. The communication system of claim 1, wherein the first device-specific packet is targeted to a group of multiple users including the first user.

4. The communication system of claim 1, wherein the first device-specific packet is targeted to the first virtual endpoint during a 1-on-1 audio communication session between the particular user and the first user.

5. The communication system of claim 1, wherein one or more packets include first audio information captured by the first physical audio device and second audio information captured by the second physical audio device, wherein the one or more packets are targeted to the particular communication device associated with the particular user.

6. The communication system of claim 1, wherein the virtual endpoints represent roles within a group of people co-operating.

7. The communication system of claim 1, wherein the first user can set at least one of input gain, output gain, and side-tone gain for individual ones of the set of at least two physical audio devices.

8. The communication system of claim 1, wherein the first user can control a setting that is shared among the set of at least two physical audio devices.

9. The communication system of claim 1, wherein the first user can control individual settings that are specific to individual ones of the set of at least two physical audio devices.

10. The communication system of claim 1, wherein the one or more hardware processors are further configured to (i) route the first device-specific packet to the first physical audio device in accordance with the first selection, and (ii) route the second device-specific packet to the first and second physical audio devices in accordance with the additional selection.

11. A method of supporting session concurrency in a communication system for role-based communication channels with virtual endpoints, wherein individual virtual endpoints are associated with one or more physical audio devices, the method comprising:

electronically storing information, wherein the information includes a first association between a first user and a first virtual endpoint, wherein the first virtual endpoint represents a virtual destination for audio information in the communication system that is not a physical endpoint, wherein the information includes a second association between the first virtual endpoint and a set of at least two physical audio devices available for selection by the first user as a physical destination for audio information in the communication system that is targeted to the first virtual endpoint, including a first physical audio device and a second physical audio device that is separate from and different from the first physical audio device;

receiving information from the first user that indicates a first selection of the first physical audio device as the physical destination for the audio information in the communication system that is targeted to the first virtual endpoint;

receiving a first device-specific packet from a particular communication device associated with a particular user, wherein the first device-specific packet includes packetized uplink information based on particular audio information captured by the particular communication device, wherein the first device-specific packet is targeted to the first virtual endpoint that is associated with the first user;

effectuating, by virtue of the first selection, a presentation of the particular audio information represented by the first device-specific packet, the presentation being performed by the first physical audio device;

receiving information from the first user that indicates an additional selection of the second physical audio device in addition to the first physical audio device as physical destinations for subsequent audio information in the communication system targeted to the first virtual endpoint, wherein the subsequent audio information is subsequent to the particular audio information;

receiving a second device-specific packet from the particular communication device associated with the particular user, wherein the second device-specific packet includes packetized uplink information based on additional audio information captured by the particular communication device, wherein the second device-specific packet is targeted to the first virtual endpoint that is associated with the first user; and effectuating, by virtue of the first selection and the additional selection, a second presentation of the additional audio information represented by the second device-specific packet, wherein the second presentation is performed by both the first physical audio device and the second physical audio device.

12. The method of claim 11, wherein the first physical audio device is an audio control panel and wherein the second physical audio device is a wireless belt pack.

13. The method of claim 11, wherein the first device-specific packet is targeted to a group of multiple users including the first user.

14. The method of claim 11, wherein the first device-specific packet is targeted to the first virtual endpoint during a 1-on-1 audio communication session between the particular user and the first user.

15. The method of claim 11, wherein one or more packets include first audio information captured by the first physical audio device and second audio information captured by the second physical audio device, wherein the one or more packets are targeted to the particular communication device associated with the particular user.

16. The method of claim 11, wherein the virtual endpoints represent roles within a group of people co-operating.

17. The method of claim 11, wherein the first user controls at least one of input gain, output gain, and side-tone gain for individual ones of the set of at least two physical audio devices.

18. The method of claim 11, wherein the first user controls a setting that is shared among the set of at least two physical audio devices.

19. The method of claim 11, wherein the first user controls individual settings that are specific to individual ones of the set of at least two physical audio devices.

20. The method of claim 11, further comprising:

(i) routing the first device-specific packet to the first physical audio device in accordance with the first selection, and (ii) routing the second device-specific packet to the first and second physical audio devices in accordance with the additional selection.

21. A communication system configured to support session concurrency for role-based communication channels with virtual endpoints, wherein individual virtual endpoints are associated with one or more physical audio devices, the system comprising:

electronic storage configured to electronically store information, wherein the information includes a first association between a first user and a first virtual endpoint, wherein the first virtual endpoint represents a virtual destination for audio information in the communication system that is not a physical endpoint, wherein the information includes a second association between the first virtual endpoint and a set of at least three physical audio devices available for selection by the first user as a physical destination for audio information in the communication system that is targeted to the first virtual endpoint, including a first physical audio device, a second physical audio device that is separate from and different from the first physical audio device, and a third physical audio device that is separate from and different from both the first physical audio device and the second physical audio device;

one or more hardware processors configured by machine-readable instructions to:

receive information from the first user that indicates a first selection of the first physical audio device as the physical destination for the audio information in the communication system that is targeted to the first virtual endpoint;

receive a first device-specific packet from a particular communication device associated with a particular user, wherein the first device-specific packet includes packetized uplink information based on particular audio information captured by the particular communication device, wherein the first device-specific packet is targeted to the first virtual endpoint that is associated with the first user;

by virtue of the first selection, effectuate a presentation of the particular audio information represented by the first device-specific packet, the presentation being performed by the first physical audio device;

receive information from the first user that indicates an additional selection of the second physical audio device and the third physical audio device in addition to the first physical audio device as physical destinations for subsequent audio information in the communication system that is targeted to the first virtual endpoint, wherein the subsequent audio information is subsequent to the particular audio information;

receive a second device-specific packet from the particular communication device associated with the particular user, wherein the second device-specific packet includes packetized uplink information based on additional audio information captured by the particular communication device, wherein the second device-specific packet is targeted to the first virtual endpoint that is associated with the first user; and by virtue of the first selection and the additional selection, effectuate a second presentation of the additional audio information represented by the second device-specific packet, wherein the second presentation is performed by all three of:

(i) the first physical audio device, (ii) the second physical audio device, and (iii) the third physical audio device.

* * * * *